May 5, 1931.  W. R. WALKER  1,803,985
ELECTRODE
Filed July 20, 1925

INVENTOR
Warren R. Walker
BY
Thos. H. Brown
HIS ATTORNEY

Patented May 5, 1931

1,803,985

UNITED STATES PATENT OFFICE

WARREN R. WALKER, OF GREAT KILLS, NEW YORK, ASSIGNOR TO GENERAL ELECTRIC VAPOR LAMP COMPANY, OF HOBOKEN, NEW JERSEY, A CORPORATION OF NEW JERSEY

ELECTRODE

Application filed July 20, 1925. Serial No. 44,697.

My present invention relates to electrodes for negative discharge glow lamps, rectifiers, radio tubes and for use in the electric art generally and to methods for producing such electrodes. It relates particularly to such electrodes and their production which are capable of withstanding a tendency to spatter and to form dark and electrically inactive spots such as commonly occur on electron discharge electrodes.

According to my invention I prevent such spattering and formation of dark spots by electroplating the surface of the electrode. For example, on an electrode of iron I apply a coating of nickel. In some cases I decrease the tendency of the electrode to spatter and spotting by saturating it with a gas such, for example, as hydrogen.

In one example of the method of my invention I achieve the saturation of an iron electrode, for example with hydrogen, and provide a coating of nickel over the surface thereof in one process. This process comprises electroplating the iron electrode with nickel in an acid electrolyte. In this process during the electrolytic action hydrogen as well as nickel is carried over to the iron electrode being treated and the hydrogen so carried is absorbed by the electrode. The hydrogen thus disseminated throughout the mass of the electrode serves as hereinafter set forth to decrease or completely prevent the tendency of the material of the electrode to spatter during the use thereof.

It is to be understood that in some embodiments of my invention an unsaturated electrode with a protective coating thereon is used, while in other cases a saturated electrode is provided with a protective coating.

It is also to be understood that the saturation of the electrode with hydrogen or other gas is produced by means other than their electrolytic action as for example by heating the electrode within an atmosphere of gas and allowing it to cool within said atmosphere.

For purposes of illustration I have shown the application of the electrode and process of my invention to a negative discharge glow lamp which is particularly adapted for use on alternating currents as well as on direct currents.

In the drawing which forms a part of this application:

Figure 1:
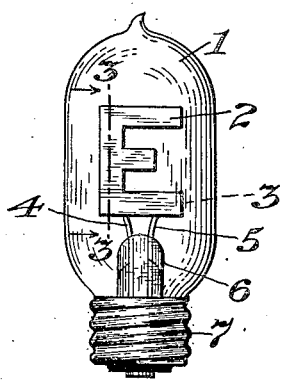
Fig. 1 is an elevation view showing a negative glow electric lamp having two electrodes of substantially the same size in the form of letter E, one of such electrodes being mounted in this view behind the other.
Figure 2:
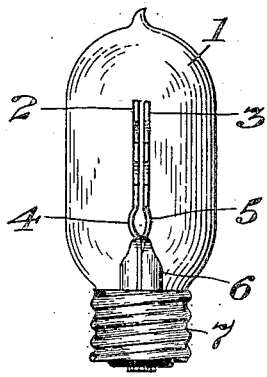
Fig. 2 is a side view of a negative glow lamp showing electrodes spaced from each other at substantially uniform distance throughout their areas.
Figure 3:
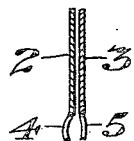
Fig. 3, is a vertical section of the electrodes of the lamp in Fig. 2 taken on line 3—3 in Fig. 1.

In Fig. 1 the lamp envelope 1 encloses the electrode 2 and a similar electrode 3 of substantially the same area which in this view is directly back of 2, therefore having the same outline. The lead-in 4 supports the electrode 2 and the lead-in 5 supports the electrode 3. The stem 6 mounted re-entrantly in lamp envelope 1 positions the two electrodes in the lamp and has sealed therethrough the lead-ins 4 and 5 which are connected to the screw socket 6 such as is well known in the lamp art. Within the lamp envelope 1 is provided an atmosphere of gas such as neon, argon, and so on which serves as a conducting vapor in the lamp. In Fig. 2, the electrodes 2 and 3 mounted in the lamp envelope 1 are shown in side elevation, being spaced apart the proper distance in accordance with the current and voltage conditions under which the lamp is designed to operate. Fig. 3 shows a vertical section through electrodes 2 and 3.

The electrodes 2 and 3 are preferably of cold rolled iron, the iron used being the purest obtainable in the market. These electrodes are electro-plated with nickel in an acid solution during which process they are saturated with hydrogen carried over in the electrolytic action at the same time that they are covered with the coating of nickel. When desired iron blanks are saturated and plated and from these the electrodes are formed of the desired shape.

In other cases, as when electrolytes are used which do not provide electrolytic actions carrying hydrogen to the electrode or which carry other substances which are deleterious or undesirable in the electrode, the plated electrode is heated, preferably in an atmosphere of hydrogen to drive off the deleterious substances and to prevent oxidation while the deleterious material is being driven off by the heat. The heated electrode is then allowed to cool in the hydrogen atmosphere, becoming saturated with hydrogen as it cools. In other cases the iron electrode is saturated by heating and cooling in an atmosphere of hydrogen and subsequently plated.

For some uses an unsaturated iron electrode is provided with a coating of nickel as by electroplating.

The electrodes of the kind above described and produced according to the above set forth methods are used as electrodes for glow lamps rectifiers, radio tubes, and other devices in which the electrodes are sealed in an evacuated envelope or in an envelope containing a filling of a gas such as neon, argon or other rare gases or mixtures of gases.

For some uses the electrode material is saturated with argon or helium instead of hydrogen or with a mixture of some or all of these gases.

The nickel coating when used alone or the nickel coating and the hydrogen with which the electrode is saturated serve to prevent spattering of the material of the electrode. The improved electrode of this invention I find has these desired characteristics and maintains them for long periods of use of the device and under conditions of operation such as at high current densities which otherwise would cause spattering of material of the electrode or the formation of dark spots on the surface of the electrode.

Other metals I use for different purposes are copper, nickel and aluminum for the electrode base and for plating the base chromium, cobalt, and iron.

I claim:

1. In a gaseous discharge device, a nickel plated conductor sealed therein, said conductor being impregnated with hydrogen.

2. In a gaseous discharge device having a filling of a rare gas, a nickel plated iron conductor sealed therein, said iron conductor being impregnated with hydrogen.

3. In an electrical negative discharge glow lamp, an envelope, a discharge electrode of iron having a coating of nickel thereon, said iron electrode being impregnated with hydrogen.

4. The method of producing electrode material for electric devices which comprise electroplating a metal base in an electrolyte and saturating said metal base with hydrogen simultaneously with the plating thereof.

5. The method of producing electrode material for electric devices which comprises electroplating an iron base in an electrolyte whereby said iron base is saturated with hydrogen simultaneously with the plating thereof.

6. In an electron discharge device, a negative electrode having substantially uniform negative electrode reluctance throughout its working surface comprising iron having a coating of electro-deposited nickel thereon, and being impregnated with hydrogen.

Signed at Hoboken in the county of Hudson and State of New Jersey this 2d day of July, A. D. 1925.

WARREN R. WALKER.